(12) United States Patent
Sheier et al.

(10) Patent No.: US 6,519,692 B1
(45) Date of Patent: Feb. 11, 2003

(54) METHOD FOR UPDATING A POINTER TO ACCESS A MEMORY ADDRESS IN A DSP

(75) Inventors: Moshe Sheier, Tel Aviv (IL); Batsheva Ovadia, Hod Hasharon (IL); Yael Gross, Ramat Gan (IL); Ronen Peretz, Herzelia (IL)

(73) Assignee: D.S.P. Group Ltd., Herzelia Pituach (IL)

( * ) Notice: Subject to any disclaimer, the term of this patent is extended or adjusted under 35 U.S.C. 154(b) by 0 days.

(21) Appl. No.: 09/385,205

(22) Filed: Aug. 30, 1999

(30) Foreign Application Priority Data

Sep. 2, 1998 (IL) ................................................ 126043

(51) Int. Cl.[7] ................................................ G06F 9/26
(52) U.S. Cl. ...................... 711/219; 711/213; 711/214; 711/215; 711/218
(58) Field of Search ................................ 711/215, 217, 711/218, 219, 213, 214, 137; 712/35, 241, 245

(56) References Cited

U.S. PATENT DOCUMENTS 5,032,983 A * 7/1991 Fu et al. ..................... 711/217
5,784,712 A * 7/1998 Byers et al. ................. 711/217
5,987,583 A * 11/1999 Triece et al. ................ 711/214
6,049,858 A * 4/2000 Kolagotla et al. ........... 711/217

* cited by examiner

Primary Examiner—Matthew Kim
Assistant Examiner—Brian R. Peugh
(74) Attorney, Agent, or Firm—Fish & Richardson P.C.

(57) ABSTRACT

A processor coupled to a memory for providing a pointer in order to access a corresponding memory address, the pointer being updated by adding a predetermined increment according to logic integral with the processor. A method is disclosed for updating the pointer to a value other than that dictated by the processor logic so as to access an arbitrary memory address dictated by an application program accessing the processor. The method comprises disabling the logic in respective of the pointer, processing the application program so as generate a successive memory address for accessing the memory, and setting the pointer to the successive memory address instead of incrementing the pointer by the predetermined increment dictated by the logic. The processor may be a DSP having an internal post-modification unit for updating each of the pointers by adding a predetermined increment so as to assign a new address to the respective pointer, and a logic circuit for selectably disabling the internal post-modification unit in respect of one or more of the pointers and enabling external post-modification of the respective pointers.

21 Claims, 2 Drawing Sheets

METHOD FOR UPDATING A POINTER TO ACCESS A MEMORY ADDRESS IN A DSP

FIELD OF THE INVENTION

This invention relates to memory addressing by a computer processor, particularly a Digital Signal Processor.

BACKGROUND OF THE INVENTION

One of the basic functions performed by a digital processor is accessing a memory for data read and write. The memory is usually accessed by means of an address supplied to it by the processor. There are several methods of generating the data address inside the processor, these methods being known as addressing modes.

One of the most common addressing modes is the so-called "indirect addressing method". In this method, one (or more) of the processor's registers, referred to as a pointer, holds the address of the memory location to be accessed. In many cases, and especially in a Digital Signal Processor, memory accesses are performed repeatedly one after the other. When using an indirect addressing mode, during each memory access the pointer used for the current access is updated with a new value corresponding to the next memory access, this operation being referred to as "post-modification".

In order to support the use of the indirect addressing mode in a programmable processor, some predefined post-modification options are usually included in the processor's architecture and instruction set. These typically include modification of the pointer by +1, −1, +step (which can be a dedicated register by itself) etc. This mechanism is referred to as "internal post-modification".

By way of example, the following operation performs an addition operation between the contents of a memory pointed to by rI, and another register named a0. The result is then written to the same register address a0, and the rI pointer is post-modified by +1 (i.e. its content is incremented):

Add(rI)+, a0

A drawback with such an approach is that the internal post-modification mechanism is inherently limited to pre-defined options only. Thus, no provision is made for the processor to run an application requiring the pointer to be updated by an amount not provided for in the specific logic of the processor.

SUMMARY OF THE INVENTION

It is an object of the invention to provide a mechanism which permits the pointer to be set by an application program to a value other than that dictated by internal post-modification.

This object is realized in accordance with a first aspect of the invention in a system comprising a processor coupled to a memory for providing a pointer in order to access a corresponding memory address, said pointer being updated by adding a predetermined increment according to logic integral with the processor, by a method for updating the pointer to a value other than that dictated by said logic so as to access an arbitrary memory address dictated by an application program accessing said processor; the method comprising:

(a) disabling the logic in respective of said pointer,
(b) processing the application program so as generate a successive memory address for accessing the memory, and
(c) setting the pointer to said successive memory address instead of incrementing the pointer by the predetermined increment dictated by said logic.

According to a second aspect of the invention, there is provided a processor comprising:

a plurality of internal registers each for storing a pointer therein for pointing to a memory address to be accessed by the pointer;

an internal post-modification unit for updating each of said pointers by adding a predetermined increment so as to assign a new address to the respective pointer;

a logic circuit for selectably disabling the internal post-modification unit in respective of one or more of said pointers and enabling external post-modification of the respective pointers.

Thus, according to the invention there is provided the possibility of external post-modification of each or any of the internal pointers. By such means, the user of a processor is able to update the pointer used for the next memory access to a value generated by an external mechanism that is application specific. This requires a dedicated interface to the user mechanism, and mode bit (or bits) used to override the predefined post-modification options supported by the instruction set, so that the address generated by the external mechanism will be used to update the pointer.

A principal feature of the invention is that it uses the post-modification options of the existing processor's instruction set, to access the external mechanism.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 1:
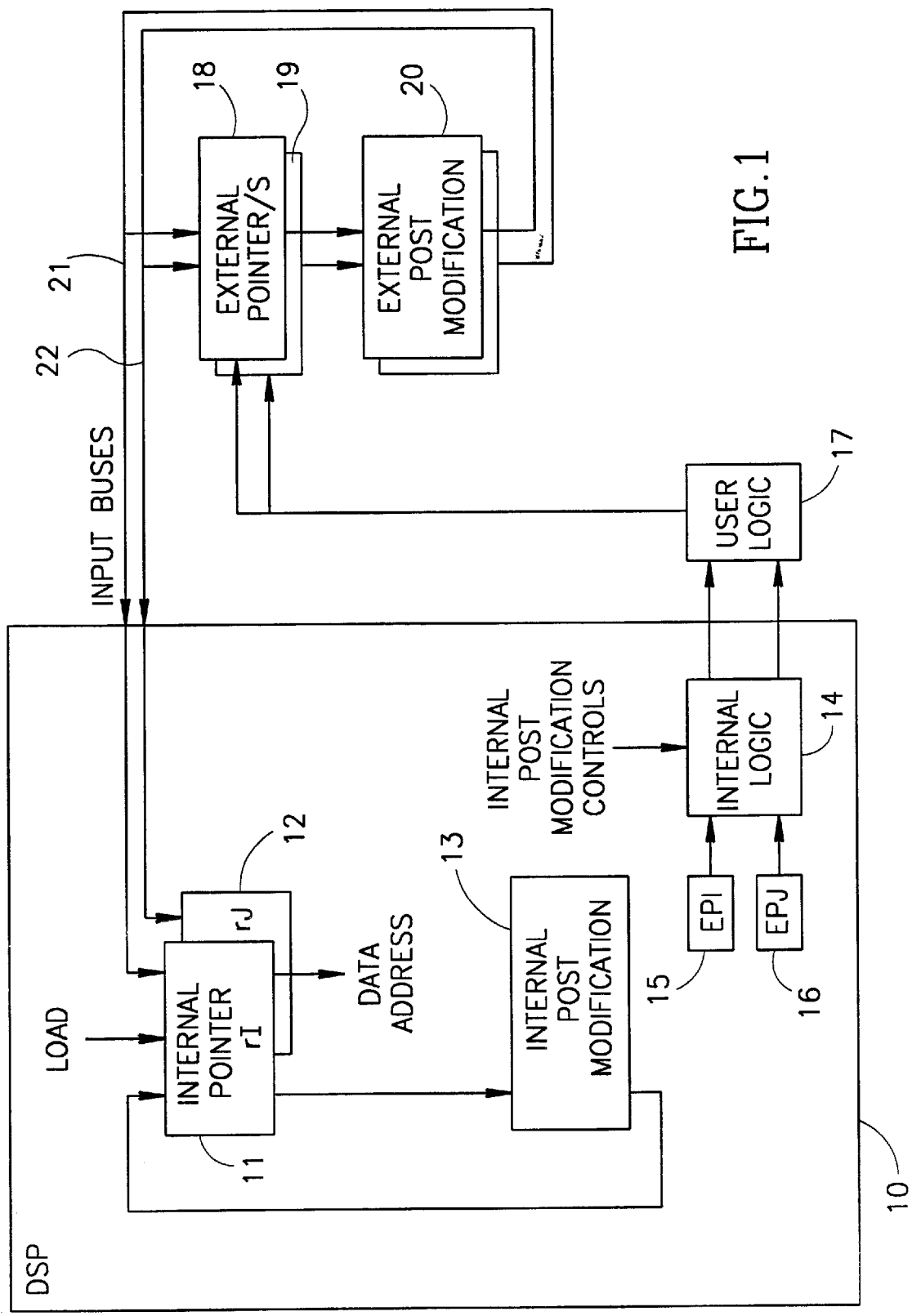
FIG. 1 is a block diagram showing functionally a processor using external post-modification of a pointer according to the invention.
Figure 2:
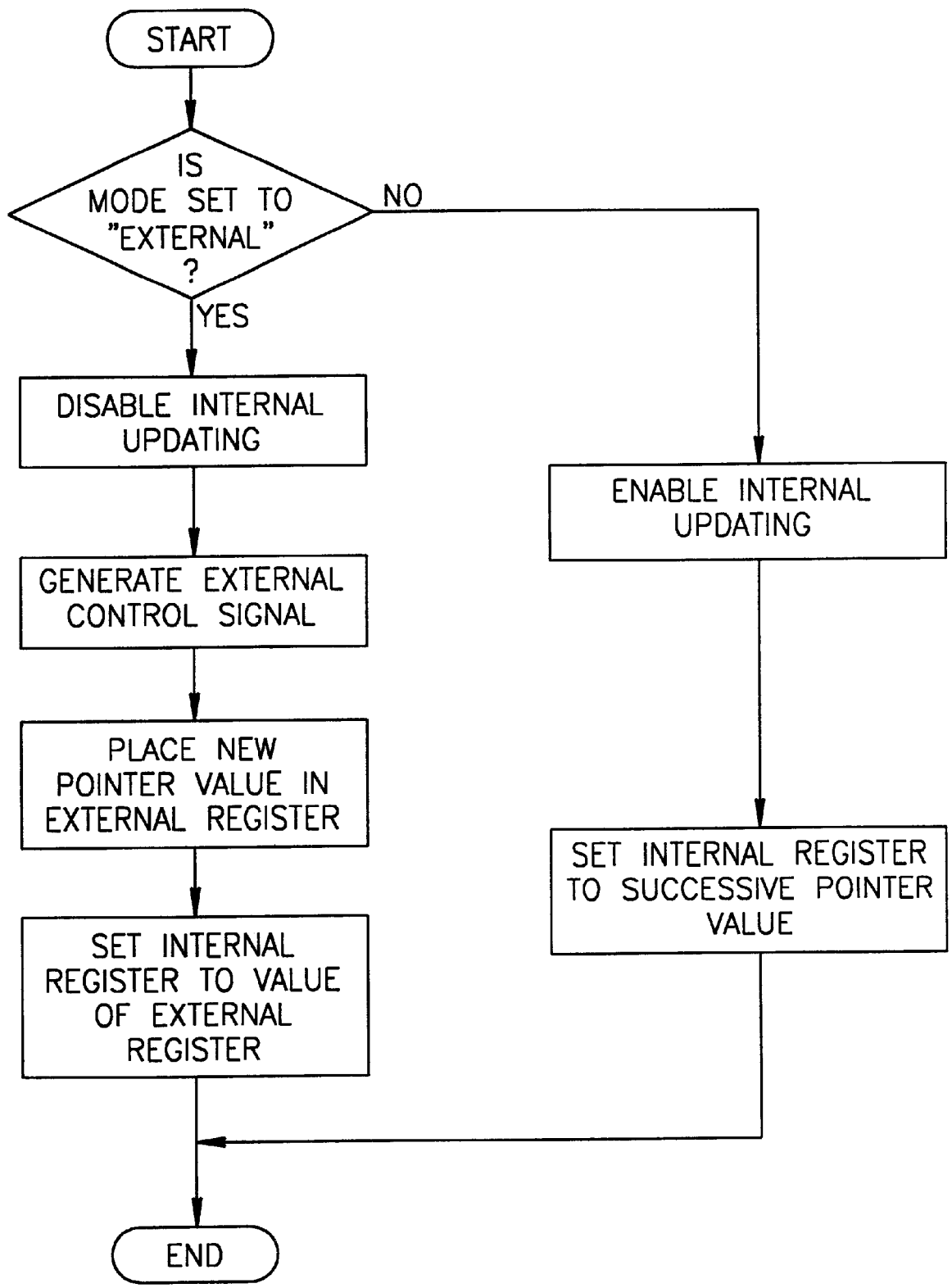
FIG. 2 is a flow diagram showing the principal steps associated with a method for achieving external post-modification of a pointer according to the invention.

FIG. 1 shows a digital signal processor (DSP) 10 (constituting a processor) coupled to a plurality of internal registers of which two are shown designated 11 and 12 and which store a respective pointer for accessing a corresponding address of a memory (not shown) coupled to the DSP 10. Coupled to the internal registers 11 and 12 is an internal post-modification unit 13 for updating each pointer by adding a predetermined increment. The internal post-modification unit 13 operates in known manner to compute a new pointer value corresponding to the next address to be accessed by adding a specified increment to its current value. This is done during the time that the current memory address is being accessed, the new pointer value being fed to the corresponding internal register so as to allow the successive memory location to be accessed.

The DSP 10 further includes an internal logic unit 14 responsively coupled to a plurality of mode select bits, of which there shown two designated 15 and 16 each in respect of a corresponding one of the internal registers 11 and 12. Thus, for example, by setting the mode select bit 15 to HIGH, the internal post-modification unit 13 is disabled in respect of the pointer stored in the internal register 11. Conversely, when the mode select bit 15 is set to LOW, the internal post-modification unit 13 is enabled in respect of the pointer stored in the internal register 11. The internal logic unit 14 is coupled to an external logic unit 17 which is itself coupled to a plurality of external registers of which there are shown two designated 18 and 19. The external registers reflect the pointer value stored in the corresponding internal register so as to allow the pointer value to be modified externally in the event that the internal registers 11 and 12 are inaccessible outside of the DSP 10, as is typically the case. The external registers 18 and 19 are coupled to an external post-modification unit 20 which is responsive to an application program for providing successive values for each of the pointers stored in the external registers 18 and 19, these being fed via respective buses 21 and 22 (again only two being shown) to the corresponding internal register 11 and 12. In such manner, the pointer stored in the corresponding internal register 11 and 12 may either be updated according to the internal post-modification unit 13 or may be set to an arbitrary value set by the application program according to whether the corresponding mode bit is LOW or HIGH.

The external post-modification unit 20 may update the external pointers according to several different schemes. Thus, the address pointer provided by the application may be arbitrary in the sense that it bears no determined relationship with the current pointer value. Alternatively, an increment other than that added by the internal post-modification unit 13 may be added so as to access a memory address offset from the current address by a different predetermined increment to that dictated by the internal post-modification unit 13. This allows the effective range of increments to be extended.

Typically, the internal post-modification unit 13 allows one of several different increments e.g. +1, +2, +4 etc. to be added to the current address pointer, according to logic associated therewith. The external post-modification unit 20 may allow increments of +90, +100 and +135 to be added thus providing altogether six possible increments according to whether the corresponding mode bit in respect of each pointer is LOW or HIGH.

Implementation

Having explained how the invention operates in general, there will now be provided a specific example with reference to the DSP 10 having two 16-bit pointers, referred to as rI and rJ. The DSP 10 is also assumed to have four options for post-modification—+1, −i, +step, and +0 (i.e. no modification to the pointer's value), for each of these two pointers, separately. The implementation shows the use of two external post-modification mechanisms, one for rI, and one for rJ.

There are two dedicated mode bits—EPI and EPJ, used to enable (when set), and disable (when cleared), the operation of the I,J external mechanisms, respectively. When one of these bits is set, the regular internal post-modification of the processor is replaced by the post-modification value coming from the external mechanism. This can be implemented for all the four internal post-modification options, for some of them, or only to one of them. In the illustrated implementation, only one of the internal post-modifications (+step) is replaced by the external one, when the corresponding mode bit is set.

The processor includes a dedicated interface to the external mechanism, comprising an input bus (or buses), through which the external post-modified address is inserted to the processor, and two output controls, indicating (when active) that the current instruction is using an external post-modification. These last two controls are used by the external mechanism to latch the post-modified address also outside of the processor, to be used as an input to the mechanism at the next cycle, since the contents of rI/rJ are not visible outside.

The arrangement shown in FIG. 1 uses two independent mechanisms, enabling the external post-modification of each one of the internal pointers, as well as both of them together. This may be extended to enable the combination of one, two or more pointers with a dedicated external post-modification mechanism for each, operated in parallel.

The external post-modification may be used by means of the following instruction sequence. In this code rI and rJ are treated as the pointers that can accept an external post-modification, and the DSP instruction which activates the external mechanism is a post-modification of +step (written as (rI)+s or (rJ)+s).

set enable bit of rI (EPI bit)
    load rI with initial value
    load "user register I" with the same initial value
    set enable bit of rJ (EPJ bit)
    load rJ with initial value
    load "user register J' with the same initial value
    . . .

There follows a single external post-modification example:

| | |
|---|---|
| mov (rI) + s ⇒ destination | ; rI is post-modified by the external mechanism |
| mov (rI) + s ⇒ destination | ; rI (as modified by the user logic) is used, ri is also post-modified by the external mechanism |
| mov (rI) + I ⇒ destination | ; rI (as modified by the user logic) is used, rI is also post-modified by an internal mechanism (incremented) |

There now follows an example showing double external post-modification

| | |
|---|---|
| add (rI) + s,(rJ) + s,aO ; | ; rI is post-modified by its external mechanism rJ is post-modified by its external mechanism |

What is claimed is:
1. In a system comprising a processor coupled to a memory for providing a pointer in order to access a corresponding memory address, said pointer being updated by adding a predetermined increment according to logic integral with the processor; a method for updating the pointer to a value other than that dictated by said logic so as to access an arbitrary memory address dictated by an application program accessing said processor; the method comprising:
    (a) disabling the logic in respect of said pointer,
    (b) externally generating a successive memory address for accessing the memory under control of the application program,
    (c) storing the successive memory address in an external register, and
    (d) transferring said successive memory address to the pointer through a dedicated interface bus instead of incrementing the pointer by the predetermined increment dictated by said logic.

2. The method according to claim 1, wherein said successive memory address is arbitrarily set by the application program.

3. The method according to claim 1, wherein step (c) includes the step of adding a predetermined offset to the pointer other than said predetermined increment so as thereby to allow for two possible increments.

4. The method according to claim 1, wherein:
said logic adds one of at least two predetermined increments, and
step (c) includes the step of adding a predetermined offset to the pointer other than said predetermined increments so as thereby to extend the range of possible increments.

5. The method according to claim 1, wherein:
the logic adds one of at least two predetermined increments, and
step (c) includes the step of adding a different predetermined offset to the pointer instead of a respective one of said predetermined increments so as thereby to extend the range of possible increments.

6. A processor comprising:
a plurality of internal registers each for storing a pointer therein for pointing to a memory address to be accessed by the pointer;
an internal post-modification unit for updating each of said pointers by adding a predetermined increment so as to assign a new address to the respective pointer;
a logic circuit for selectably disabling the internal post-modification unit in respect of one or more of said pointers, and
an external post-modification unit coupled to the logic unit and being responsive to the internal post-modification unit being disabled for enabling external post-modification by an application program of the respective pointers via a dedicated interface bus.

7. The processor according to claim 6, wherein the logic circuit is responsive to a respective enabling bit in respect of each pointer for selecting internal or external post-modification.

8. The processor according to claim 7, wherein the external post-modification unit is coupled to a plurality of external registers each in respect of a corresponding one of the internal registers and being set to an identical pointer value as that in the corresponding internal register.

9. The processor according to claim 6, wherein the external post-modification unit is coupled to a plurality of external registers each in respect of a corresponding one of the internal registers and being set to an identical pointer value as that in the corresponding internal register.

10. The processor according to claim 6, wherein the external post-modification unit is responsive to data provided by an application program for updating the respective pointers.

11. The processor according to claim 10, wherein the external post-modification unit is responsive to data generated by the application program for adding to each pointer a different respective increment defined by the application program.

12. The processor according to claim 10, wherein the external post-modification unit is responsive to said data for arbitrarily setting each pointer to a value defined by the application program.

13. The processor according to claim 6, wherein the external post-modification unit is responsive to data generated by the application program for adding to each pointer an increment defined by the application program.

14. The processor according to claim 6, being a digital signal processor (DSP).

15. A processor comprising:
a plurality of internal registers each for storing a pointer therein for pointing to a memory address to be accessed by the pointer;
an internal post-modification unit for updating each of said pointers by adding a predetermined increment so as to assign a new address to the respective pointer;
a logic circuit responsive to a respective enabling bit in respect of each pointer for selecting internal post-modification or for selecting external post-modification by disabling the internal post-modification unit in respect of one or more of said pointers and enabling external post-modification of the respective pointers.

16. The processor according to claim 15, wherein the logic circuit is coupled to a plurality of external registers each in respect of a corresponding one of the internal registers and being set to an identical pointer value as that in the corresponding internal register.

17. The processor according to claim 15, wherein the logic circuit is responsive to data provided by the application program for updating the respective pointers.

18. The processor according to claim 17, wherein the logic circuit is responsive to said data generated by the application program for adding to each pointer a different respective increment defined by the application program.

19. The processor according to claim 17, wherein the logic circuit is responsive to data generated by the application program for adding to each pointer an increment defined by the application program.

20. The processor according to claim 15, wherein the logic circuit is responsive to data provided by the application program for adding to each pointer an increment defined by the application program.

21. The processor according to claim 15, being a digital signal processor (DSP).

* * * * *